United States Patent
Yamagishi et al.

(10) Patent No.: US 9,062,239 B2
(45) Date of Patent: Jun. 23, 2015

(54) ACRYLIC RUBBER COMPOSITION AND VULCANIZED PRODUCT THEREOF

(75) Inventors: Uichiro Yamagishi, Itoigawa (JP);
Toshiaki Miyauchi, Itoigawa (JP);
Yasushi Abe, Itoigawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 933 days.

(21) Appl. No.: 12/665,105

(22) PCT Filed: Jan. 29, 2008

(86) PCT No.: PCT/JP2008/051315
§ 371 (c)(1),
(2), (4) Date: Dec. 17, 2009

(87) PCT Pub. No.: WO2009/001571
PCT Pub. Date: Dec. 31, 2008

(65) Prior Publication Data
US 2010/0196644 A1    Aug. 5, 2010

(30) Foreign Application Priority Data
Jun. 28, 2007    (JP) .................. 2007-170799

(51) Int. Cl.
| B32B 1/02 | (2006.01) |
| B32B 1/08 | (2006.01) |
| C09K 3/10 | (2006.01) |
| C08L 33/06 | (2006.01) |
| B32B 23/00 | (2006.01) |
| C08K 5/16 | (2006.01) |
| C08L 61/06 | (2006.01) |
| C08L 79/02 | (2006.01) |

(52) U.S. Cl.
CPC .............. *C09K 3/10* (2013.01); *Y10T 428/139* (2013.01); *C08K 5/16* (2013.01); *C08L 33/064* (2013.01); *C08L 61/06* (2013.01); *C08L 79/02* (2013.01); *C08L 2205/03* (2013.01); *C09K 2200/0607* (2013.01); *C09K 2200/0625* (2013.01)

(58) Field of Classification Search
USPC ................... 428/34.1, 34.2, 35.7, 35.9, 36.9; 525/484, 504, 132, 221, 222, 318
See application file for complete search history.

(56) References Cited

U.S. PATENT DOCUMENTS

| 2003/0186049 A1 * | 10/2003 | Czaplicki et al. ....... 428/355 EP |
| 2004/0204551 A1 * | 10/2004 | Czaplicki et al. ............. 525/524 |
| 2010/0009105 A1 | 1/2010 | Yamagishi et al. .......... 428/36.9 |

FOREIGN PATENT DOCUMENTS

| EP | 0432923 A1 * | 6/1991 |
| EP | 0 860 458 A2 | 8/1998 |
| EP | 0 860 458 A3 | 8/1998 |
| EP | 1 378 539 A1 | 1/2004 |
| JP | 63 12627 | 1/1988 |
| JP | 63012627 A * | 1/1988 |
| JP | 11 80488 | 3/1999 |
| JP | 11 100478 | 4/1999 |
| JP | 2004 59667 | 2/2004 |
| JP | 2004 175841 | 6/2004 |

* cited by examiner

*Primary Examiner* — Marc Patterson
(74) *Attorney, Agent, or Firm* — Oblon, McClelland, Maier & Neustadt, L.L.P.

(57) ABSTRACT

To provide an acrylic rubber composition and its vulcanized product, having excellent workability and an excellent balance of the vulcanization properties, the reduction of scorching, the rubber mechanical properties, the compression set and the heat resistance.

An acrylic rubber composition comprising a carboxy group-containing acrylic rubber, a novolac phenol resin salt of a diazabicycloalkene compound and a polyamine compound. Particularly, the diazabicycloalkene compound is preferably 2,3,4,6,7,8,9,10-octahydropyrimido(1,2-a)azepine or 2,3,4,6,7,8-hexahydropyrrolo(1,2-a)pyrimidine, and the polyamine compound is preferably an aromatic polyamine or an aliphatic polyamine.

14 Claims, No Drawings

ACRYLIC RUBBER COMPOSITION AND VULCANIZED PRODUCT THEREOF

TECHNICAL FIELD

The present invention relates to an acrylic rubber composition excellent in balance of various physical properties, with which compounding and kneading operation is easily carried out, and a vulcanized product thereof.

BACKGROUND ART

An acrylic rubber composition, which is excellent in heat resistance and oil resistance, has been widely used as a hose part or a sealing article in an engine room of an automobile. However, along with exhaust emission controls, a trend toward higher output power of engines, etc. in recent years, conditions under which a hose part or a sealing component is used become severer, and one having a higher heat resistance has been desired.

Such a hose component and a sealing component are further required to have physical properties such as normal state physical properties and compression set. Further, in recent years, in order to improve the productivity, reduction of scorching has been desired for the purpose of improving the vulcanization rate and the productivity.

As an acrylic rubber composition satisfying such requirements, one containing a carboxy group as a crosslinkable site has been known (e.g. Patent Document 1).

In vulcanization of an acrylic rubber composition containing a carboxy group as a crosslinkable site, diamine vulcanization is generally considered to be preferred in view of required physical properties of a vulcanized product. Particularly, it has been known that as a vulcanization accelerator, 2,3,4,6,7,8,9,10-octahydropyrimido(1,2-a)azepine or its salt is effective (e.g. Patent Document 2).

Such a vulcanization accelerator is to improve various physical properties of an acrylic rubber composition, however, its improving effects are still insufficient. Particularly, 2,3,4,6,7,8,9,10-octahydropyrimido(1,2-a)azepine is a strongly basic liquid compound and is difficult to handle, and is problematic in workability such that kneading by an open roll mill is hardly carried out. Further, 2,3,4,6,7,8,9,10-octahydropyrimido(1,2-a)azepine salts are usually liquids, but are deliquescent even if they are solids, and accordingly they are problematic in workability in the same manner as the above compound. Further, the balance of normal state physical properties, compression set, heat resistance, etc. of an acrylic rubber composition to be obtainable is still insufficient.

Patent Document 1: JP-A-11-100478
Patent Document 2: JP-A-11-080488

DISCLOSURE OF THE INVENTION

Object to be Accomplished by the Invention

The object of the present invention is to provide an acrylic rubber composition excellent in the balance of the vulcanization properties, the reduction in scorching, the rubber mechanical properties, the compression set, the heat resistance, etc., with which compounding and kneading operation is easily carried out, and a vulcanized product thereof.

Means to Accomplish the Object

That is, the present invention provides the following.
(1) An acrylic rubber composition comprising a carboxy group-containing acrylic rubber, and per 100 parts by mass of the carboxy group-containing acrylic rubber, from 0.1 to 2.0 parts by mass of a novolac phenol resin salt of a diazabicycloalkene compound, and from 0.1 to 4.5 parts by mass of a polyamine compound.
(2) The acrylic rubber composition according to the above (1), wherein the diazabicycloalkene compound is at least one compound selected from 2,3,4,6,7,8,9,10-octahydropyrimido(1,2-a)azepine and 2,3,4,6,7,8-hexahydropyrrolo(1,2-a)pyrimidine.
(3) The acrylic rubber composition according to the above (1) or (2), wherein the novolac phenol resin is one represented by the following formula (1):

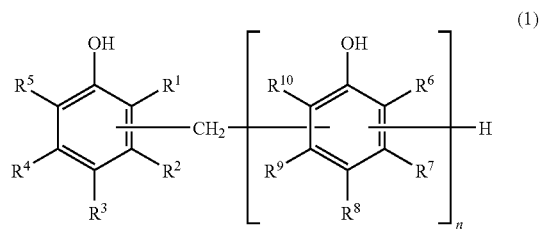

wherein each of $R^1$ to $R^{10}$ which are independent of one another, is H, OH, $(CH_2)_m CH_3$ (wherein m=0 to 20) or Ph, provided that Ph is a benzene ring.
(4) The acrylic rubber composition according to any one of the above (1) to (3), wherein the polyamine compound is at least one compound selected from the group consisting of an aromatic polyamine and an aliphatic polyamine.
(5) The acrylic rubber composition according to any one of the above (1) to (3), wherein the polyamine compound is an aromatic polyamine represented by the following formula (2):

wherein M is O, S, $SO_2$, CONH or O—R—O, provided that R in O—R—O is Ph, Ph-Ph, Ph-$SO_2$-Ph, $(CH_2)m$ (m=3 to 5), Ph-$CH_2$—$C(CX_3)_2$—$CH_2$-Ph (X is H or F) or $(CH_2)C(CH_3)_2$ $(CH_2)$, provided that Ph is a benzene ring.
(6) The acrylic rubber composition according to any one of the above (1) to (3), wherein the polyamine compound is at least one compound selected from the group consisting of 4,4'-bis(4-aminophenoxy)biphenyl, 4,4'-diaminodiphenyl sulfide, 1,3-bis(4-aminophenoxy)-2,2-dimethylpropane, 1,3-bis(4-aminophenoxy)benzene, 1,4-bis(4-aminophenoxy)benzene, 1,4-bis(4-aminophenoxy)pentane, 2,2-bis[4-(4-aminophenoxy)phenyl]propane, 2,2-bis[4-(4-aminophenoxy)phenyl]sulfone, 4,4'-diaminodiphenylsulfone, bis(4-3-aminophenoxy)phenylsulfone, 2,2-bis[4-(4-aminophenoxy)phenyl]hexafluoropropane, 3,4'-diaminodiphenyl ether, 4,4'-diaminodiphenyl ether, 4,4'-diaminobenzanilide, bis[4-(4-aminophenoxy)phenyl]sulfone, hexamethylenediamine, hexamethylenediamine carbamate, N,N'-dicinnamylidene-1,6-hexanediamine, diethylenetriamine, triethylenetetramine and tetraethylenepentamine.
(7) A vulcanized product obtained by vulcanizing the acrylic rubber composition as defined in any one of the above (1) to (6).
(8) A rubber hose comprising the vulcanized product as defined in the above (7).
(9) A sealing article comprising the vulcanized product as defined in the above (7).
(10) A rubber vibration insulator comprising the vulcanized product as defined in the above (7).

(11) A rubber tube comprising the vulcanized product as defined in the above (7).
(12) An industrial belt component comprising the vulcanized product as defined in the above (7).
(13) A wire coating rubber comprising the vulcanized product as defined in the above (7).
(14) A boot for an automobile comprising the vulcanized product as defined in the above (7).

Effects of the Invention

The acrylic rubber composition and the vulcanized product thereof of the present invention are excellent in the balance of the vulcanization properties, the reduction in scorching, the rubber mechanical properties, the compression set and the heat resistance, and compounding and kneading operation is easily carried out with them.

BEST MODE FOR CARRYING OUT THE INVENTION

The acrylic rubber composition is obtained by kneading a carboxy group-containing acrylic rubber, a novolac phenol resin salt of a diazabicycloalkene compound and a polyamine compound.

The carboxy group-containing acrylic rubber is one obtainable by copolymerizing an unsaturated monomer such as an acrylic acid alkyl ester with a carboxy group-containing unsaturated fatty acid by a known method such as emulsion polymerization, suspension polymerization, solution polymerization or bulk polymerization.

The acrylic acid alkyl ester may, for example, be methyl acrylate, ethyl acrylate, n-propyl acrylate, isobutyl acrylate, n-butyl acrylate, n-pentyl acrylate, n-hexyl acrylate, n-octyl acrylate or 2-ethylhexyl acrylate.

Further, as the acrylic acid alkyl ester, n-decyl acrylate, n-dodecyl acrylate, n-octadecyl acrylate, cyanomethyl acrylate, 1-cyanoethyl acrylate, 2-cyanoethyl acrylate, 1-cyanopropyl acrylate, 2-cyanopropyl acrylate, 3-cyanopropyl acrylate, 4-cyanobutyl acrylate, 6-cyanohexyl acrylate, 2-ethyl-6-cyanohexyl acrylate or 8-cyanooctyl acrylate may, for example, be used.

Further, as the acrylic acid alkyl ester, an acrylic acid alkoxy alkyl ester may, for example, be used, such as 2-methoxyethyl acrylate, 2-ethoxyethyl acrylate, 2-(n-propoxy) ethyl acrylate, 2-(n-butoxy)ethyl acrylate, 3-methoxypropyl acrylate, 3-ethoxypropyl acrylate, 2-(n-propoxy)propyl acrylate or 2-(n-butoxy)propyl acrylate.

Further, as the acrylic acid alkyl ester, a fluorinated acrylic acid ester such as 1,1-dihydroperfluoroethyl(meth)acrylate, 1,1-dihydroperfluoropropyl(meth)acrylate, 1,1,5-trihydroperfluorohexyl(meth)acrylate, 1,1,2,2-tetrahydroperfluoropropyl(meth)acrylate, 1,1,7-trihydroperfluoroheptyl(meth)acrylate, 1,1-dihydroperfluorooctyl(meth)acrylate or 1,1-dihydroperfluorodecyl(meth)acrylate; a hydroxy group-containing acrylic acid ester such as 1-hydroxypropyl(meth) acrylate, 2-hydroxypropyl(meth)acrylate or hydroxyethyl (meth)acrylate; a tertiary amino group-containing acrylic acid ester such as diethylaminoethyl(meth)acrylate or dibutylaminoethyl(meth)acrylate; or a methacrylate such as methyl methacrylate or octyl methacrylate may, for example, be used.

As the acrylic acid alkyl ester, one of these monomers may be used alone or two or more monomers may be used in combination.

The carboxy group-containing unsaturated fatty acid is not particularly limited. It may, for example, be an unsaturated carboxylic acid such as acrylic or methacrylic acid; an aliphatic unsaturated dicarboxylic acid such as maleic acid, fumaric acid, itaconic acid or citraconic acid; or an aliphatic unsaturated dicarboxylic acid monoester such as monomethyl malate, monoethyl malate, mono-n-propyl malate, monoisopropyl malate, mono-n-butyl malate, monoisobutyl malate, monomethyl fumarate, monoethyl fumarate, mono-n-propyl fumarate, monoisopropyl malate, mono-n-butyl fumarate, monomethyl itaconate, monoethyl itaconate, mono-n-propyl itaconate, mono-n-propyl citraconate, mono-n-butyl citraconate or monoisobutyl citraconate. One of these compounds may be used alone, or two or more monomers may be used in combination.

The carboxy group-containing unsaturated fatty acid is preferably copolymerized so that it will be in a proportion of from 0.1 to 20 mass %, preferably from 0.1 to 10 mass % in the obtainable carboxy group-containing acrylic rubber, whereby the vulcanization properties of the carboxy group-containing acrylic rubber will be improved.

To the carboxy group-containing acrylic rubber, a crosslinkable monomer other than the acrylic acid alkyl ester, or another copolymerizable monomer may be copolymerized depending upon the particular purpose within a range not to impair the effects of the present invention.

The crosslinkable monomer other than the acrylic acid alkyl ester may, for example, be a carboxylic acid group-containing compound such as acrylic acid, methacrylic acid, crotonic acid, 2-pentenoic acid, maleic acid, fumaric acid or itaconic acid, an epoxy group-containing compound such as glycidyl acrylate, glycidyl methacrylate, allyl glycidyl ether or metharyl glycidyl ether; or an active chlorine-containing compound such as 2-chloroethyl vinyl ether, 2-chloroethyl acrylate, vinyl benzyl chloride, vinyl chloroacetate or allyl chloroacetate. One of these compounds may be used alone or two or more monomers may be used in combination.

With respect to the amount of such a crosslinkable monomer, it is preferably copolymerized so that it will be in a proportion of from 0.1 to 20 mass %, preferably from 0.1 to 10 mass % in the obtainable carboxy group-containing acrylic rubber.

The above copolymerizable monomer may, for example, be an alkyl vinyl ketone such as methyl vinyl ketone; a vinyl or allyl ether, such as vinyl ethyl ether or allyl methyl ether; a vinyl aromatic compound such styrene, α-methylstylene, chlorostyrene, vinyl toluene or vinyl naphthalene; a vinyl nitrile such as acrylonitrile or methacrylonitrile; or an ethylenically unsaturated compound such as acrylamide, vinyl acetate, ethylene, propylene, butadiene, isoprene, pentadiene, vinyl chloride, vinylidene chloride, vinyl fluoride, vinylidene fluoride, vinyl propionate or an alkyl fumarate.

With respect to the amount of such another copolymerizable monomers, it is preferably copolymerized so that it will be in a proportion of from 0.1 to 20 mass %, preferably from 0.1 to 10 mass %, in the obtainable carboxy group-containing acrylic rubber.

The diazabicycloalkene compound is a compound having a diazabicycloalkene structure. It may, for example, be 2,3,4, 6,7,8,9,10-octahydropyrimido[1,2-a]azepine (also referred to as 1,8-diazabicyclo[5.4.0]undec-7-ene), 2,3,4,6,7,8-hexahydropyrrolo(1,2-a)pyrimidine, 1,5-diazabicyclo[4,3,0] nona-5-ene, or a compound having a substituent on a carbon atom and/or a nitrogen atom of the base skeleton of such a compound.

The novolac phenol resin is one obtained by the following formula (1). It may, for example, be a phenol novolac resin, an alkyl phenol novolac resin, a cresol novolac resin or a bisphenol A novolac resin. Among them, a phenol novolac resin is preferred in view of the cost.

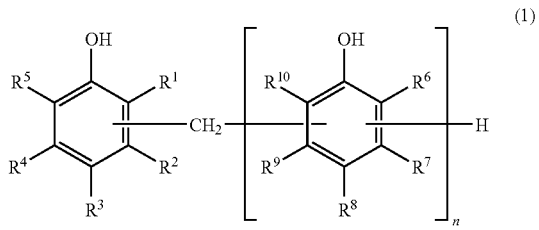

(1)

wherein each of $R^1$ to $R^{10}$ which are independent of one another, is H, OH, $(CH_2)_mCH_3$ (wherein m=0 to 20) or Ph, provided that Ph is a benzene ring.

The novolac phenol resin salt of a diazabicycloalkene compound is obtainable by mixing the above diazabicycloalkene compound with a novolac phenol resin. By the above mixing, proton will migrate from the phenol group of the novolac phenol resin to the nitrogen atom of the diazabicycloalkene compound, whereby a novolac phenol resin salt of a diazabicycloalkene compound which is in an ionic state will be obtained. The diazabicycloalkene compound and the novolac phenol resin are mixed in a proportion of preferably from 10:90 to 90:10, more preferably from 20:80 to 70:30, as calculated as the mass.

By mixing the novolac phenol resin salt of a diazabicycloalkene compound in an amount of from 0.1 to 2.0 parts by mass, preferably from 0.2 to 1.4 parts by mass per 100 parts by mass of the carboxy group-containing acrylic rubber, the required sufficient vulcanization reaction of the carboxy group-containing acrylic rubber can be carried out with excellent workability. Therefore, mechanical properties and the compression set at high temperature of the obtainable acrylic rubber composition can be improved.

The polyamine compound is at least one compound selected from the group consisting of an aromatic polyamine and an aliphatic polyamine.

The aromatic polyamine compound is a compound represented by the following formula (2).

$$H_2N\text{-Ph-M-Ph-}NH_2 \quad (2)$$

wherein M is one of O, S, $SO_2$, CONH and O—R—O, provided that R in O—R—O is Ph, Ph-Ph, Ph-$SO_2$-Ph, $(CH_2)m$ (m=3 to 5), Ph-$CH_2$—$C(CX_3)_2$—$CH_2$-Ph (X is H or F) or $(CH_2)C(CH_3)_2$), and Ph is a benzene ring.

The aromatic polyamine compound represented by the formula (2) may, for example, be 4,4'-bis(4-aminophenoxy)biphenyl, 4,4'-diaminodiphenyl sulfide, 1,3-bis(4-aminophenoxy)-2,2-dimethylpropane, 1,3-bis(4-aminophenoxy)benzene, 1,4-bis(4-aminophenoxy)benzene, 1,4-bis(4-aminophenoxy)pentane, 2,2-bis[4-(4-aminophenoxy)phenyl]propane, 2,2-bis[4-(4-aminophenoxy)phenyl]sulfone, 4,4'-diaminodiphenylsulfone, bis(4-3-aminophenoxy)phenylsulfone, 2,2-bis[4-(4-aminophenoxy)phenyl]hexafluoropropane, 3,4'-diaminodiphenyl ether, 4,4'-diaminodiphenyl ether, 4,4'-diaminobenzanilide or bis[4-(4-aminophenoxy)phenyl]sulfone.

The aliphatic polyamine compound is not particularly limited, and it may, for example, be hexamethylenediamine, hexamethylenediamine carbamate, N,N'-dicinnamylidene-1,6-hexanediamine, diethylenetriamine, triethylenetetramine or tetraethylenepentamine. As the polyamine compound, one of these compounds may be used alone, or two or more of them may be used in combination.

The amount of the polyamine compound is from 0.1 to 4.5 parts by mass, preferably from 0.6 to 1.5 parts by mass per 100 parts by mass of the carboxy group-containing acrylic rubber. With such an amount, the required sufficient vulcanization reaction of the carboxy group-containing acrylic rubber can be carried out, and mechanical properties and the compression set at high temperature of the obtainable acrylic rubber composition can be improved.

To the acrylic rubber composition, a bulking agent, a reinforcing agent, a plasticizer, an antioxidant, a stabilizer, a lubricant, etc. may be added for forming and vulcanization, depending upon the purpose of use at the practical use.

As the bulking agent and the reinforcing agent, a bulking agent and a reinforcing agent which are usually used for a rubber may be used, and they are not particularly limited. For example, carbon black, acetylene black, a silicic anhydride such as silica or surface-treated calcium carbonate may be mentioned. Such a bulking agent and a reinforcing agent may be used alone or in combination as a mixture of two or more of them.

The amount of the bulking agent or the reinforcing agent is, in total, preferably from 10 to 100 parts by mass, more preferably from 30 to 80 parts by mass, per 100 parts by mass of the acrylic rubber composition.

As the plasticizer, various plasticizers which are usually used for a rubber may be used, and it is not particularly limited. For example, an ester plasticizer or an ether plasticizer such as polyoxyethylene ether may be mentioned. Such plasticizers may be used alone or in combination as a mixture of two or more of them. The amount of the plasticizer is preferably up to about 50 parts by mass, more preferably at most 30 parts by mass per 100 parts by mass of the acrylic rubber composition.

As the antioxidant, an antioxidant which is usually used for a rubber may be used, and it is not particularly limited. For example, an antioxidant such as an amine type, an imidazole type, a metal salt of carbamic acid, a phenol type, a phosphorus type, a sulfur type or wax may be mentioned. The amount of the antioxidant is preferably from 0.1 to 15 parts by mass, more preferably from 0.5 to 5 parts by mass per 100 parts by mass of the acrylic rubber composition.

The rubber component in the acrylic rubber composition comprises the carboxy group-containing acrylic rubber as the main component, and in addition to the carboxy group-containing acrylic rubber, as the case requires, a natural rubber, or a synthetic rubber such as IIR, BR, NBR, HNBR, CR, EPDM, FKM, Q, CSM, CO, ECO or CM may be incorporated. The abbreviations of such synthetic rubbers are in accordance with ISO1329.

The acrylic rubber composition of the present invention is produced by compounding and mixing the above constituents, and its method is by means of a known means. For example, the mixing is carried out using a mixing machine such as a Banbury mixer or a roll mill, preferably at from 10 to 80° C. preferably for from 3 to 30 minutes. Further, also when a vulcanized product is obtained from the acrylic rubber composition of the present invention, a known means is used. That is, when the acrylic rubber composition of the present invention is kneaded, formed and vulcanized, machines and conditions adopted therefor are those conventionally used in the rubber field.

The acrylic rubber composition and its vulcanized product are used, particularly, for rubber hoses, sealing articles such as gaskets and packings, and vibration insulting components. Specific examples of the rubber hoses include a transmission oil cooler hose, an engine oil cooler hose, a turbo intercooler hose, a turbo air duct hose, a power steering hose, a hot air hose, a radiator hose and a diesel turbo charger hose; hoses for an oil system and a fuel system including a high pressure system, and a drain system hose in other industrial machines and building machines.

Specific examples of the sealing articles include an engine head cover gasket, an oil pan gasket, an oil seal, a lip seal packing, an O-ring, a transmission seal gasket, a seal gasket of a crankshaft or a camshaft, valve stem, a power steering seal, a belt cover seal, a boot material for CVJ or R&P.

Examples of a rubber vibration insulator include a damper pulley, a center support cushion, a suspension bush and an engine mount.

Particularly, the acrylic rubber composition and its vulcanized product of the present invention have excellent mechanical properties and also have excellent cold resistance, oil resistance and heat resistance, so that they can be quite suitably used as rubber hoses for automobiles, or as oil sealing products such as gaskets, which recently tend to be used in a severer environment.

A structure of a rubber hose may be a single hose obtained from the acrylic rubber composition of the present invention. Further, depending upon the application, it may be applicable to a composite hose wherein a synthetic rubber other than the acrylic rubber composition of the present invention, for example, a fluorinated rubber, a fluorine-modified acrylic rubber, a hydrin rubber, CSM, CR, NBR or an ethylene/propylene rubber, is used for the inner layer, an inter layer or an outer layer, in combination with a layer comprising the acrylic rubber composition of the present invention.

Further, depending upon the properties required for a rubber hose, it is also possible to provide an intermediate or outermost layer of the rubber hose with a reinforcing fiber or wire, as is generally commonly carried out.

EXAMPLES

Now, the present invention will be described in further detail with reference to Examples. However, it should be understood that the present invention is by no means restricted to such Examples.

<Preparation of Carboxy Group-containing Acrylic Rubber>

100 Parts by mass of an acrylic rubber (DENKA ER-A403 manufactured by Denki Kagaku Kogyo Kabushiki Kaisha), 1 part by mass of stearic acid, 1 part by mass of 4,4-bis($\alpha$, $\alpha$-dimethylbenzyl)diphenylamine, 50 parts by mass of carbon black (FEF; #609 manufactured by Asahi Carbon Co., Ltd.), 0.3 part by mass of stearylamine and 1 part by mass of liquid paraffin were kneaded by using an 8-inch roll to obtain a carboxy group-containing acrylic rubber.

Example 1

To 100 parts by mass of the carboxy group-containing acrylic rubber, 1.0 part by mass of 2,2-bis[4-(4-aminophenoxy)phenyl]propane and 0.7 part by mass of a novolac phenol resin salt of 2,3,4,6,7,8,9,10-octahydropyrimido[1,2-a]azepine were added to obtain an acrylic rubber composition.

The acrylic rubber composition thus obtained was evaluated with respected to a scorch time (t5) at a test temperature of 125° C. using an L-shape rotor in accordance with JIS K6300.

<Vulcanization>

The acrylic rubber composition thus obtained was subjected to heat treatment at 170° C. for 20 minutes using an electrically heating press, to obtain a primary vulcanized product. The primary vulcanized product thus obtained was further subjected to heat treatment at 170° C. in a gear oven for 4 hours to obtain a secondary vulcanized product.

The primary vulcanized product and the secondary vulcanized product were evaluated with respect to the 100% modulus, the tensile strength and the elongation in accordance with JIS K6251 and also evaluated with respect to the hardness using a durometer in accordance with JIS K6253.

Furthermore, the secondary vulcanized product thus obtained was evaluated with respect to the compression set at 150° C. for 70 hours in accordance with JIS K6262.

Examples 2 To 5 and Comparative Examples 1 to 8

An acrylic rubber composition, a primary vulcanized product and a secondary vulcanized product were obtained in the same manner as in Example 1 based on the compounding amounts (part(s) by mass) as shown in Tables 1 and 2, and evaluated in the same manner as in Example 1.

TABLE 1

|  |  |  | Ex. 1 | Ex. 2 | Ex. 3 | Ex. 4 | Ex. 5 |
| --- | --- | --- | --- | --- | --- | --- | --- |
| Carboxy group-containing acrylic rubber |  |  | 100 | 100 | 100 | 100 | 100 |
| 2,2-Bis[4-(4-amino-phenoxy)phenyl]propane |  |  | 1.0 | 1.0 | 1.0 | 0.6 | 1.5 |
| Novolac phenol resin salt of 2,3,4,6,7,8,9,10-octahydropyrimido(1,2-a)azepine |  |  | 0.7 | 0.2 | 1.4 | 0.4 | 0.4 |
| Processing safety (scorch time) | MLt5 (125° C.) | min. | 13.6 | 18.2 | 11.2 | 13.1 | 15.4 |
| Physical properties of primary vulcanized product | 100% Modulus | MPa | 3.6 | 3.3 | 4.4 | 3.9 | 3.2 |
|  | Tensile strength | MPa | 10.1 | 9.9 | 10.6 | 10.4 | 8.8 |
|  | Elongation | % | 304 | 322 | 264 | 311 | 330 |
|  | Hardness | Shore A | 58 | 58 | 58 | 58 | 57 |
| Physical properties of secondary vulcanized product | 100% Modulus | MPa | 5.9 | 5.9 | 6.2 | 4.9 | 6.7 |
|  | Tensile strength | MPa | 11.3 | 11.3 | 11.6 | 10.9 | 11.8 |
|  | Elongation | % | 175 | 176 | 172 | 188 | 164 |
|  | Hardness | Shore A | 67 | 68 | 68 | 68 | 68 |
| Compression set | CS (150° C. × 70 h) | % | 16 | 17 | 18 | 15 | 19 |
| Form of vulcanization accelerator |  |  | Powdery | Powdery | Powdery | Powdery | Powdery |

TABLE 2

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Carboxy group-containing acrylic rubber | | 100 | 100 | 100 | 100 | 100 | 100 | 100 | 100 |
| 2,2-Bis[4-(4-amino-phenoxy)phenyl]propane | | 1.2 | 1.0 | 1.0 | 0.05 | 3.0 | 1.0 | 1.0 | 1.0 |
| 2,3,4,6,7,8,9,10-Octahydropyrimido(1,2-a)azepine | | 0.4 | — | — | — | — | — | — | — |
| Novolac phenol resin salt of 2,3,4,6,7,8,9,10-octahydropyrimido(1,2-a)azepine | | — | 0.05 | 3.0 | 0.4 | 0.4 | — | — | — |
| 2-Ethylhexanoate of 2,3,4,6,7,8,9,10-octahydropyrimido(1,2-a)azepine | | — | — | — | — | — | 1.2 | — | — |
| p-Toluenesulfonate of 2,3,4,6,7,8,9,10-octahydropyrimido(1,2-a)azepine | | — | — | — | — | — | — | 1.4 | — |
| Phenolate of 2,3,4,6,7,8,9,10-octahydropyrimido(1,2-a)azepine | | — | — | — | — | — | — | — | 1.0 |
| Processing safety (scorch time) | MLt5 (125° C.) min. | 8.1 | Not vulcanized | 13.3 | Not vulcanized | 33.4 | 8.3 | Not vulcanized | 9.4 |
| Physical properties of primary vulcanized product | 100% Modulus MPa | 3.7 | | 4.8 | | 4.9 | 3.8 | | 3.8 |
| | Tensile strength MPa | 11.2 | | 13.2 | | 13.1 | 10.6 | | 11.0 |
| | Elongation % | 225 | | 183 | | 193 | 234 | | 247 |
| | Hardness Shore A | 58 | | 58 | | 58 | 57 | | 57 |
| Physical properties of secondary vulcanized product | 100% Modulus MPa | 5.3 | | 5.9 | | 4.9 | 5.5 | | 5.6 |
| | Tensile strength MPa | 12.6 | | 13.9 | | 13.6 | 11.1 | | 11.0 |
| | Elongation % | 121 | | 81 | | 86 | 144 | | 132 |
| | Hardness Shore A | 66 | | 68 | | 68 | 66 | | 68 |
| Compression set | CS (150° C. × 70 h) % | 23 | | 44 | | 89 | 25 | | 26 |
| Form of vulcanization accelerator | | | Liquid | Powdery | | Powdery | Deliquescent solid | | Viscous liquid |

The novolac phenol resin salt of 2,3,4,6,7,8,9,10-octahydropyrimido(1,2-a)azepine which is a vulcanization accelerator used in Examples is a powdery solid which is not deliquescent, and was thereby weighed by a spatula at the time of weighing. Further, since there is no surface slip between the carboxy group-containing acrylic rubber and a kneading roll, kneading by a roll was easily carried out. In Examples, compounding and kneading operation was easily carried out in production of the acrylic rubber composition.

In Comparative Example 7, when the compounds were kneaded by using an 8-inch roll, p-toluenesulfonate of 2,3,4,6,7,8,9,10-octahydropyrimido(1,2-a)azepine was agglomerated and could not be dispersed in the carboxy group-containing acrylic rubber, whereby no uniform vulcanized product could be obtained.

Industrial Applicability

The acrylic rubber composition and its vulcanized product of the present invention have excellent mechanical properties and also have excellent cold resistance, oil resistance and heat resistance, so that they are very useful as rubber hoses for automobiles, or as oil sealing products such as gaskets, which recently tend to be used in severer environment.

The entire disclosure of Japanese Patent Application No. 2007-170799 filed on Jun. 28, 2007 including specification, claims and summary is incorporated herein by reference in its entirety.

The invention claimed is:

1. An acrylic rubber composition consisting of a carboxy group-containing acrylic rubber, and per 100 parts by mass of the carboxy group-containing acrylic rubber, from 0.1 to 2.0 parts by mass of a novolac phenol resin salt of a diazabicycloalkene compound, and from 0.1 to 4.5 parts by mass of a polyamine compound, wherein the acrylic rubber contains no units formed from an epoxy-group containing monomer.

2. The acrylic rubber composition according to claim 1, wherein the diazabicycloalkene compound is at least one compound selected from 2,3,4,6,7,8,9,10-octahydropyrimido (1,2-a)azepine and 2,3,4,6,7,8-hexahydropyrrolo(1,2-a)pyrimidine.

3. The acrylic rubber composition according to claim 1, wherein the novolac phenol resin is one represented by the following formula (1):

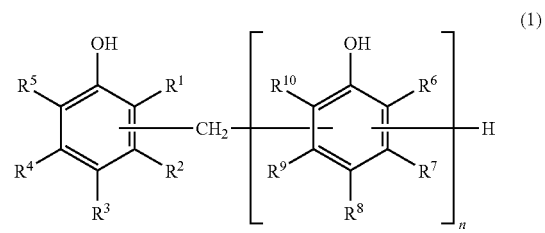

wherein each of $R^1$ to $R^{10}$ which are independent of one another, is H, OH, $(CH_2)_m CH_3$ (wherein m=0 to 20) or Ph, provided that Ph is a benzene ring.

4. The acrylic rubber composition according to claim 1, wherein the polyamine compound is at least one compound selected from the group consisting of an aromatic polyamine and an aliphatic polyamine.

5. The acrylic rubber composition according to claim 1, wherein the polyamine compound is an aromatic polyamine represented by the following formula (2):

$$H_2N\text{-Ph-M-Ph-}NH_2 \qquad (2)$$

wherein M is O, S, $SO_2$, CONH or O—R—O, provided that R in O—R—O is Ph, Ph-Ph, Ph-$SO_2$-Ph, $(CH_2)_m$, Ph-$CH_2$—$C(CX_3)_2$—$CH_2$-Ph (X is H or F) or $(CH_2)C(CH_3)_2(CH_2)$, provided that Ph is a benzene ring and m is 3 to 5.

6. The acrylic rubber composition according to claim 1, wherein the polyamine compound is at least one compound selected from the group consisting of 4,4'-bis(4-aminophenoxy)biphenyl, 4,4'-diaminodiphenyl sulfide, 1,3-bis(4-aminophenoxy)-2, 2-dimethylpropane, 1,3-bis(4-aminophenoxy)benzene, 1,4-bis(4-aminophenoxy)benzene, 1,4-bis(4-aminophenoxy)pentane, 2,2-bis[4-(4-aminophenoxy)phenyl]propane, 2,2-bis[4-(4-aminophenoxy)phenyl]sulfone, 4,4'-diaminodiphenylsulfone, bis(4-3- aminophenoxy)phenylsulfone, 2,2-bis[4-(4-aminophenoxy)phenyl]hexafluoropropane, 3,4'-diaminodiphenyl ether, 4,4'-diaminodiphenyl ether, 4,4'-diaminobenzanilide, bis[4-(4-aminophenoxy)phenyl]sulfone, hexamethylenediamine, hexamethylenediamine carbamate, N,N'-dicinnamylidene-1,6-hexanediamine, diethylenetriamine, triethylenetetramine and tetraethylenepentamine.

7. A vulcanized product obtained by vulcanizing the acrylic rubber composition as defined in claim 1.

8. A rubber hose comprising the vulcanized product as defined in claim 7.

9. A sealing article comprising the vulcanized product as defined in claim 7.

10. A rubber vibration insulator comprising the vulcanized product as defined in claim 7.

11. A rubber tube comprising the vulcanized product as defined in claim 7.

12. An industrial belt component comprising the vulcanized product as defined in claim 7.

13. A wire coating rubber comprising the vulcanized product as defined in claim 7.

14. A boot for an automobile comprising the vulcanized product as defined in claim 7.

* * * * *